United States Patent
Chen et al.

(10) Patent No.: US 12,138,729 B2
(45) Date of Patent: Nov. 12, 2024

(54) ELECTROMAGNETICALLY DRIVEN FAST TOOL SERVO SYSTEM BASED ON FLEXIBLE HINGE COMBINATION MECHANISM

(71) Applicant: Zhejiang University, Hangzhou (CN)

(72) Inventors: Yuanliu Chen, Hangzhou (CN); Peng Hu, Hangzhou (CN); Ye Tao, Hangzhou (CN); Huilin Du, Hangzhou (CN); Bingfeng Ju, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 326 days.

(21) Appl. No.: 17/757,360

(22) PCT Filed: Mar. 11, 2021

(86) PCT No.: PCT/CN2021/080227
§ 371 (c)(1),
(2) Date: Jun. 14, 2022

(87) PCT Pub. No.: WO2021/232902
PCT Pub. Date: Nov. 25, 2021

(65) Prior Publication Data
US 2023/0025956 A1    Jan. 26, 2023

(30) Foreign Application Priority Data
May 22, 2020 (CN) .......................... 202010446005.2

(51) Int. Cl.
*B23Q 5/36* (2006.01)
*B23Q 5/28* (2006.01)
(52) U.S. Cl.
CPC ................ *B23Q 5/36* (2013.01); *B23Q 5/28* (2013.01)

(58) Field of Classification Search
CPC ................................... B23Q 5/28; B23Q 5/36
See application file for complete search history.

(56) References Cited

U.S. PATENT DOCUMENTS

2014/0375146 A1* 12/2014 Schneider ........ B29D 11/00932
310/12.14

FOREIGN PATENT DOCUMENTS

| CN | 101386141 A | 3/2009 |
|---|---|---|
| CN | 102554633 A | 7/2012 |

(Continued)

*Primary Examiner* — Jason L Vaughan
(74) *Attorney, Agent, or Firm* — Muncy, Geissler, Olds & Lowe, P.C.

(57) ABSTRACT

The present invention provides an electromagnetically driven fast tool servo system based on a flexible hinge combination mechanism, including a base, a voice coil motor arranged in the base, a tool mounting base connected to a coil of the voice coil motor by a first connecting portion, and a grating measurement device connected to the first connecting portion by a guide shaft arranged at a center of the voice coil motor, where the first connecting portion includes a first flexible hinge, a second flexible hinge, a first connecting member located between the first flexible hinge and the second flexible hinge, and a second connecting member located between the second flexible hinge and the coil of the voice coil motor; the tool mounting base, the first flexible hinge, the first connecting member, the second flexible hinge, the second connecting member, and an end of the guide shaft are coaxially connected in series by a first horizontal screw; the first flexible hinge and the second flexible hinge have sheet-like cross structures with the same shape, with end portions of cross arms fixedly connected to the base. In the present invention, axial and lateral precision of the system in a machining process is improved.

16 Claims, 3 Drawing Sheets

(56) References Cited

FOREIGN PATENT DOCUMENTS

| | | | |
|---|---|---|---|
| CN | 103009071 | A | 4/2013 |
| CN | 103273358 | A | 9/2013 |
| CN | 103354412 | A | 10/2013 |
| CN | 103357894 | A | 10/2013 |
| CN | 103394705 | A | 11/2013 |
| CN | 103978392 | A | 8/2014 |
| CN | 104889950 | A | 9/2015 |
| CN | 204700851 | U | 10/2015 |
| CN | 205702462 | U | 11/2016 |
| CN | 106405825 | A | 2/2017 |
| CN | 108639383 | A | 10/2018 |
| CN | 108760548 | A | 11/2018 |
| CN | 109014993 | A | 12/2018 |
| CN | 109877628 | A | 6/2019 |
| CN | 110086319 | A | 8/2019 |
| CN | 110125711 | A | 8/2019 |
| CN | 110142637 | A | 8/2019 |
| CN | 110328549 | A | 10/2019 |
| CN | 111791079 | A | 10/2020 |
| GB | 734631 | A | 8/1955 |
| JP | S58-188372 | A | 11/1983 |
| KR | 10-1521566 | B1 | 5/2015 |

\* cited by examiner

ELECTROMAGNETICALLY DRIVEN FAST TOOL SERVO SYSTEM BASED ON FLEXIBLE HINGE COMBINATION MECHANISM

TECHNICAL FIELD

The present invention relates to a fast tool servo device, and in particular, to an electromagnetically driven fast tool servo system based on a flexible hinge combination mechanism.

BACKGROUND

Ultra-precision cutting technology is one of important methods for machining surface microstructures of key components in fields of information electronics, optics, aerospace, and the like. With the help of a diamond tool which features a sharp cutting edge, high hardness, good wear resistance, an ultra-thin cutting thickness, and the like, the ultra-precision cutting technology has the advantage of being capable of machining complex surfaces/curved surfaces with ultra-smoothness (surface roughness Ra is less than 10 nm) and high precision (surface shape precision is better than 100 nm). Fast tool servo (FTS) is the most representative ultra-precision machining method.

The fast tool servo technology features high stiffness, high frequency response, and high positioning precision, and is especially suitable for a three-dimensional microstructure surface with a small structural characteristic period and a complex curved surface shape. In addition, compared with photolithography technology, femtosecond laser machining technology, special energy field machining technology, and the like, the fast tool servo technology has high surface shape machining precision, free-form surface manufacturing capability and batch replication capability, and has obvious advantages in machining three-dimensional microstructure free-form surfaces.

However, with the diversification of materials to be machined and an extreme machining environment, requirements in various fields for a fast tool servo ultra-precision machining system are more stringent: the system has extremely high machining precision (1 nm) in a larger stroke (1 mm). At present, a commonly used piezoelectric ceramic driven fast tool servo system cannot meet the requirements because its stroke is usually tens of microns. It is difficult for a magnetostrictive fast tool servo system and a Maxwell force driven fast tool servo system to meet requirements for ultra-high machining precision due to their nonlinearity and magnetic effect.

Comparatively, an electromagnetically driven fast tool servo system gradually shows its advantages due to the rapid development of voice coil motors, features a large stroke and high precision, and has broad development prospects. However, the system is still limited by conduction mechanism: a flexible hinge used for the piezoelectric ceramic driven fast tool servo system has a small stroke and stiffness far greater than a working range of the voice coil motor; and it is also difficult for an air-bearing guide rail and an ultra-precision bearing to meet requirements of a fast tool servo machining system for axial and lateral precision.

Therefore, against the foregoing shortcomings, an electromagnetically driven fast tool servo system based on a flexible hinge combination mechanism is provided, to solve the following problems:
1. A conduction mechanism for a large-stroke fast tool servo system has an excessively small stroke.
2. It is difficult to ensure axial and lateral precision of the system by the conduction mechanism for the large-stroke fast tool servo system.

SUMMARY

An objective of the present invention is to provide an electromagnetically driven fast tool servo system based on a flexible hinge combination mechanism in view of requirements for a large stroke and high precision of an ultra-precision machining system. Through a design of three different flexible hinges, while the large stroke of the system is ensured, axial and lateral stiffness of the mechanism is improved, a deformation and a stroke loss caused by stretching of the mechanism are weakened, axial and lateral precision of the system in the machining process is improved, and the design and development of the electromagnetically driven large-stroke and high-precision fast tool servo system are implemented.

To achieve the foregoing objective, the present invention uses the following technical solution:

An electromagnetically driven fast tool servo system based on a flexible hinge combination mechanism, including a base, a voice coil motor arranged in the base, a tool mounting base connected to a coil of the voice coil motor by a conduction mechanism, and a displacement measurement mechanism connected to the conduction mechanism by a guide shaft arranged at a center of the voice coil motor, where the conduction mechanism includes a first flexible hinge, a second flexible hinge, a first connecting member located between the first flexible hinge and the second flexible hinge, and a second connecting member located between the second flexible hinge and the coil of the voice coil motor; the tool mounting base, the first flexible hinge, the first connecting member, the second flexible hinge, the second connecting member, and an end of the guide shaft are coaxially connected in series by a first horizontal screw; the first flexible hinge and the second flexible hinge have sheet-like cross structures with the same shape, with end portions of cross arms fixedly connected to the base.

Further, a width of the cross arm of each of the first flexible hinge and the second flexible hinge is greater than ½ of a width of the entire hinge.

Further, an arc-shaped connecting portion is arranged between adjacent cross arms of the first flexible hinge and the second flexible hinge.

Further, the second connecting member is fixedly connected to the coil of the voice coil motor by several circumferentially-arranged horizontal screws.

Further, the displacement measurement mechanism includes a grating ruler, a grating ruler reading head arranged at a tail end of the grating ruler, a third flexible hinge, and a third connecting member, where the third flexible hinge and the third connecting member connect the grating ruler to the other end of the guide shaft; the grating ruler, the third flexible hinge, the third connecting member, and the other end of the guide shaft are connected in series by a second horizontal screw; the third flexible hinge has a sheet-like cross structure, with an end portion of a cross arm fixedly connected to the base.

Further, a width of the cross arm of the third flexible hinge is less than ⅓ of the width of the entire hinge.

Further, a thickness and axial stiffness of the third flexible hinge are less than those of the first flexible hinge and the second flexible hinge.

Further, the base is further provided with a limiting block for axially limiting the third flexible hinge, and the limiting block is located on a side close to the grating ruler.

Further, an end of the guide shaft close to the second connecting member is provided with a step structure.

Further, the base includes a base plate and an enclosure, and a housing of the voice coil motor is fixedly connected to the enclosure by a plurality of screws.

Compared with the prior art, the present invention has the following beneficial effects:

First, flexible hinges designed in the present invention meet requirements for a stroke of the large-stroke fast tool servo system and requirements of a voice coil motor for stiffness of a conduction mechanism, and large-stroke conduction is implemented.

Second, different axial stiffness of different hinges of the flexible hinges weakens the deformation of a guide shaft, and ensures consistency of axial displacement of a diamond tool and a grating ruler.

Third, a ratio of lateral stiffness to flexural stiffness of different hinges of the flexible hinges weakens lateral deviation of a diamond tool nose caused by gravity, and ensures machining precision of the electromagnetically driven large-stroke and high-precision fast tool servo system.

DESCRIPTION OF EMBODIMENTS

To further understand the present invention, preferred implementation solutions of the present invention are described below with reference to embodiments, but it should be understood that these descriptions are only intended to further illustrate the features and advantages of the present invention, and are not intended to limit the claims of the present invention.

An embodiment of the present invention relates to an electromagnetically driven large-stroke and high-precision fast tool servo system with flexible hinges as a conduction mechanism. The system is suitable for fields of information electronics, aerospace, new energy, biomedicine, and the like in which ultra-precision machining and measurement products are used as key components.

Figure 1:
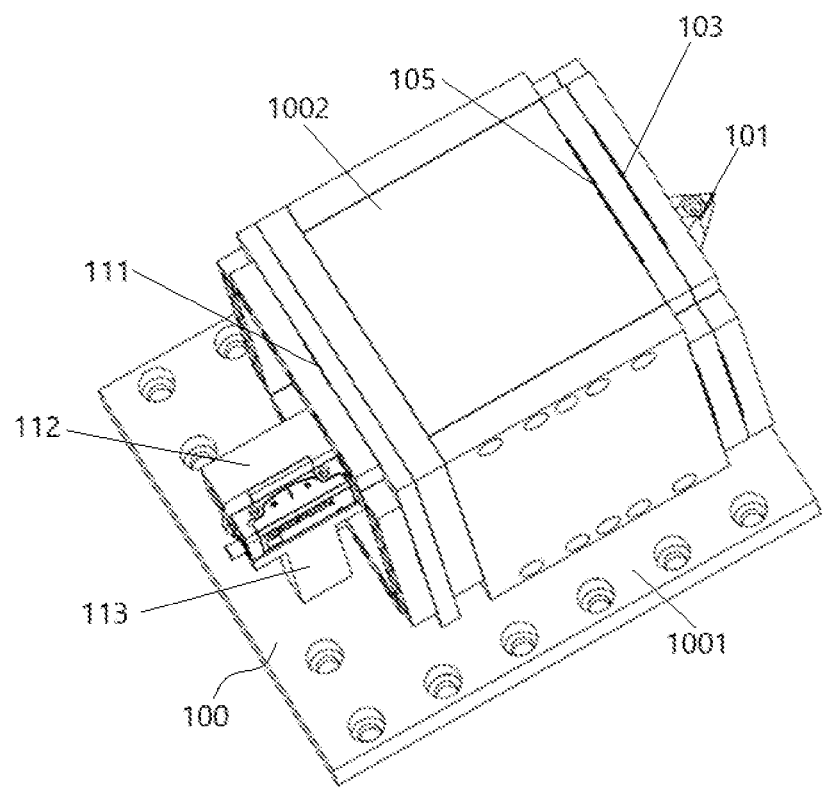
FIG. 1 is a schematic structural diagram of an electromagnetically driven fast tool servo system according to an embodiment of the present invention.
Figure 2:
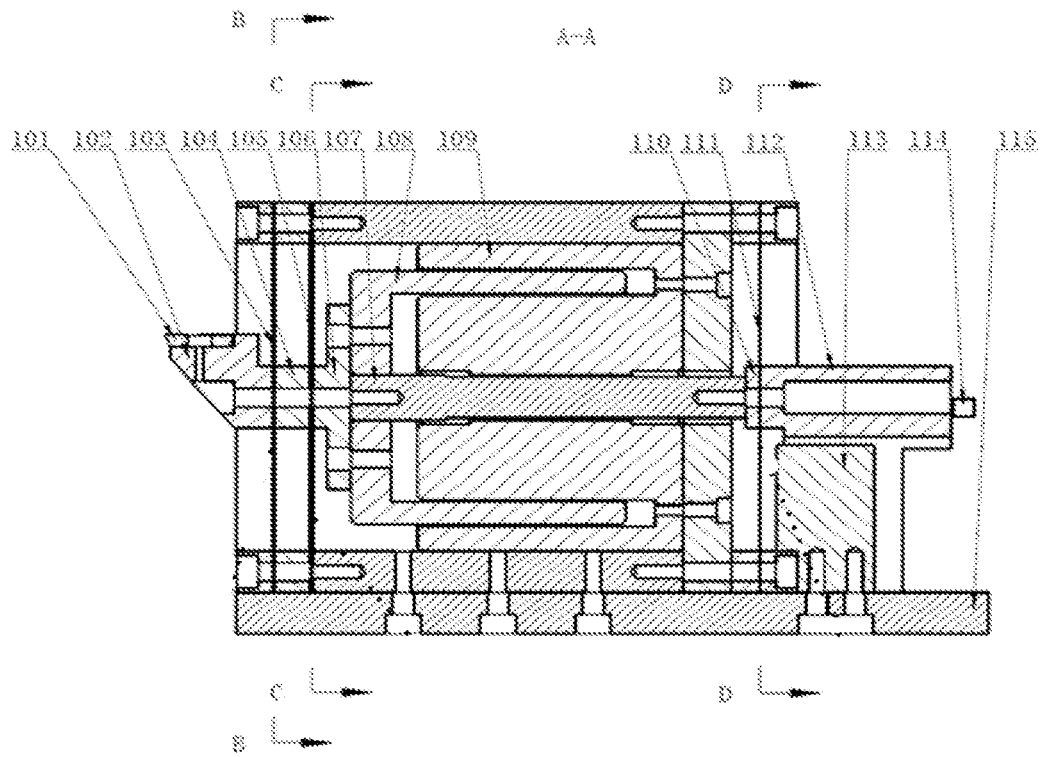
FIG. 2 is a central sectional view of the embodiment in FIG. 1 in a forward direction.

As shown in FIG. 1 and FIG. 2, in this embodiment, the electromagnetically driven large-stroke and high-precision fast tool servo system with flexible hinges as a conduction mechanism includes:

a base 100, including a base plate 1001 and an enclosure 1002 which are fixedly connected by a plurality of screws; and a voice coil motor arranged in the enclosure 1002, including a housing 109 of the voice coil motor and a coil 108 of the voice coil motor. The housing 109 of the voice coil motor is fixedly connected to the enclosure 1002 by a plurality of screws to ensure a stable operation state of the voice coil motor.

A center of the voice coil motor is provided with a through hole, and a guide shaft 107 is installed in the through hole. A diameter of the guide shaft 107 is slightly less than a diameter of a central hole of the housing of the voice coil motor, and two ends of the guide shaft are provided with threaded inner hole structures.

An end of the guide shaft 107 and the coil 108 of the voice coil motor are connected to a tool mounting base 102 by a conduction mechanism. The conduction mechanism includes a first flexible hinge 103, a second flexible hinge 105, a first connecting member 104 located between the first flexible hinge 103 and the second flexible hinge 105, and a second connecting member 106 located between the second flexible hinge 105 and the coil 108 of the voice coil motor. The tool mounting base 102, a center of the first flexible hinge 103, a center of the first connecting member 104, a center of the second flexible hinge 105, a center of the second connecting member 106, and one end of the guide shaft 107 are provided with through holes/threaded holes matching in position/size, so that the foregoing components can be coaxially connected in series by the same horizontal screw, to form a front end of an integral moving component. In addition, the second connecting member 106 is fixedly connected to the coil 108 of the voice coil motor by several circumferentially-arranged horizontal screws. Therefore, the voice coil motor can drive the tool mounting base 102 by the conduction mechanism to move.

Figure 3:
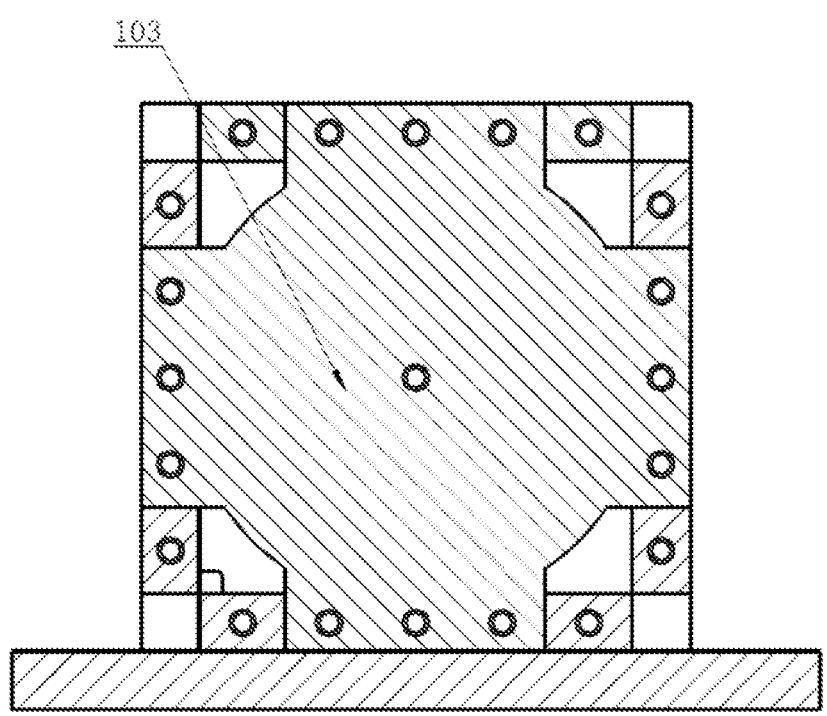
FIG. 3 is a sectional view of the embodiment in FIG. 2 along a first flexible hinge (B-B)
Figure 4:
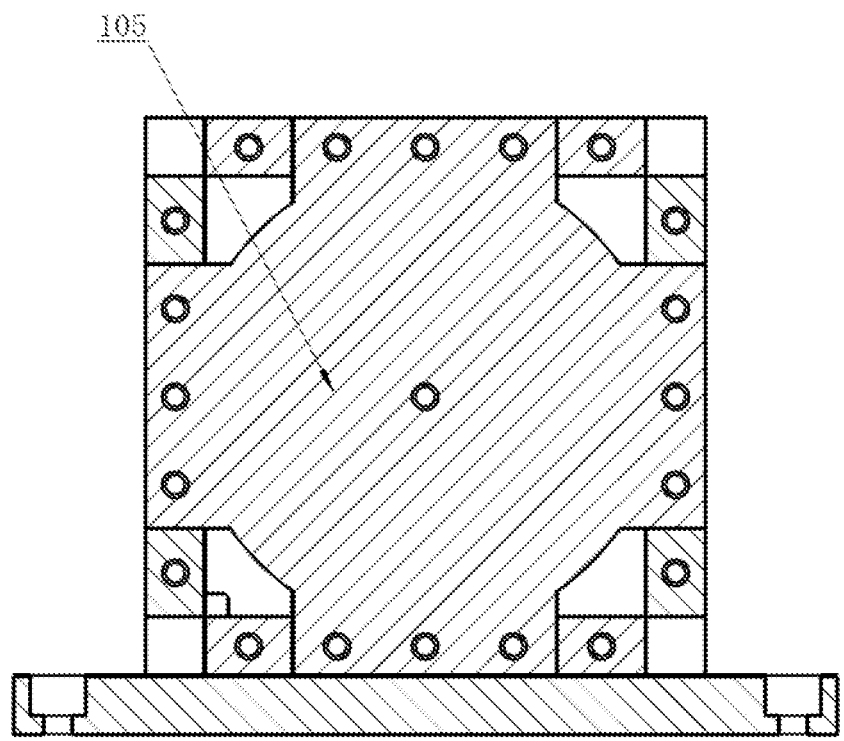
FIG. 4 is a sectional view of the embodiment in FIG. 2 along a second flexible hinge (C-C)

As shown in FIG. 3 and FIG. 4, in this embodiment, the first flexible hinge 103 and the second flexible hinge 105 have sheet-like cross structures with the same shape, with end portions of cross arms fixedly connected to the enclosure 1002 by several screws.

In a preferred implementation solution, a width of the cross arm of each of the first flexible hinge 103 and the second flexible hinge 105 is greater than ½ of a width of the entire hinge. A wider cross arm can ensure axial stiffness of the hinge, and enables higher lateral stiffness and torsional stiffness.

In a further preferred implementation solution, an arc-shaped connecting portion is arranged between adjacent cross arms of the first flexible hinge 103 and the second flexible hinge 105. The arc-shaped connecting portion weakens stress concentration and strengthens lateral and flexural stiffness.

In this embodiment, a diamond tool 101 is installed on the tool mounting base 102, and connected to the tool mounting base 102 by a vertical screw, and the tool mounting base 102 is provided with a concave step to position and limit the diamond tool 101.

As shown in FIG. 2, the fast tool servo system in this embodiment further includes a displacement measurement mechanism arranged at a rear end. The displacement measurement mechanism includes a grating ruler 112, a grating ruler reading head 114 arranged at a tail end of the grating ruler 112, a third flexible hinge 111, and a third connecting member 110, where the third flexible hinge 111 and the third connecting member 110 connect the grating ruler 112 to the other end of the guide shaft 107. The grating ruler 112, the third flexible hinge 111, the third connecting member 110, and the other end of the guide shaft 107 are provided with through holes/threaded holes matching in position/size, so that the foregoing components are connected in series by the same horizontal screw.

Figure 5:
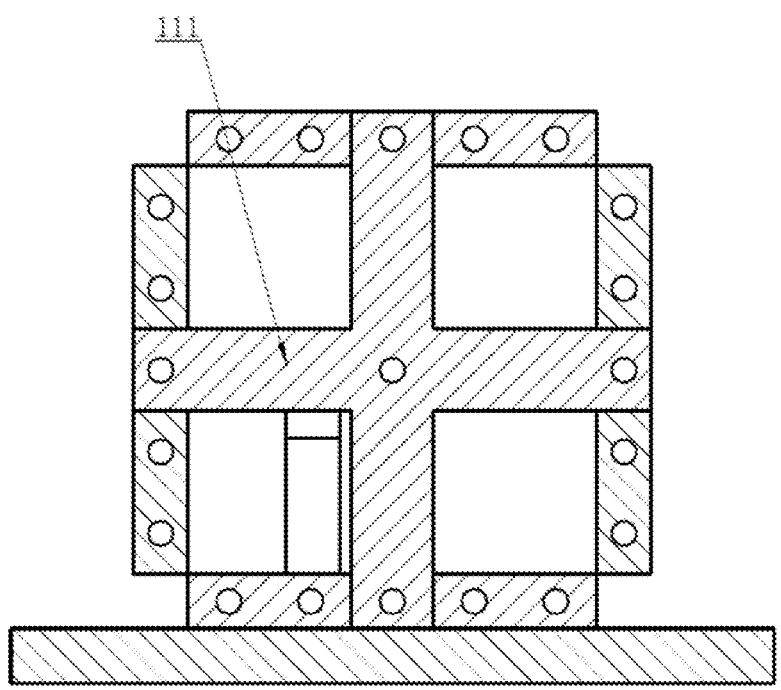
FIG. 5 is a sectional view of the embodiment in FIG. 2 along a third flexible hinge (D-D).

As shown in FIG. 5, in this embodiment, the third flexible hinge 111 has a sheet-like cross structure, with an end portion of a cross arm fixedly connected to the enclosure 1002 by several screws. The design of the third flexible hinge weakens the impact of the gravity of the coil of the voice coil motor on lateral deviation of the diamond tool.

In a preferred implementation solution, a width of the cross arm of the third flexible hinge 111 is less than ⅓ of the width of the entire hinge.

In a further preferred implementation solution, a thickness and axial stiffness of the third flexible hinge 111 are less than those of the first flexible hinge 103 and the second flexible hinge 105.

In this embodiment, the design of the third flexible hinge weakens stress of the guide shaft and the axial deformation of the guide shaft, thereby ensuring consistency of axial displacement of the diamond tool and the grating ruler.

In a further preferred implementation solution, in this embodiment, an end of the guide shaft 107 close to the second connecting member 106 is provided with a step structure, to reduce deformation of the guide shaft.

As shown in FIG. 2, in the fast tool servo system in this embodiment, the base 100 is further provided with a limiting block 113 for axially limiting the third flexible hinge 111. The limiting block 113 is located on a side close to the grating ruler 112.

In the fast tool servo system in this embodiment, the three flexible hinges that are not completely the same ensure axial and lateral stability of the system, and weaken the axial and lateral deformation of related components of the system.

When the fast tool servo system in this embodiment is installed, the housing of the voice coil motor is fixed first, then related moving components including the coil of the voice coil motor, the first flexible hinge, the second flexible hinge, the third flexible hinge, the guide shaft, and connecting members therebetween are assembled, then the moving components, the displacement measurement mechanism/limiting block, and the like are installed on a fixing plate, and finally the system is installed on a machining platform.

The description of the foregoing embodiments is only for helping to understand the method of the present invention and its core idea. It should be noted that for a person of ordinary skill in the art, several improvements and modifications can be further made to the present invention without departing from the principle of the present invention. These improvements and modifications shall also fall within the protection scope of the claims of the present invention.

What is claimed is:

1. An electromagnetically driven fast tool servo system based on a flexible hinge combination mechanism, comprising:
    a base;
    a voice coil motor arranged in the base, the voice coil comprising a coil;
    a tool mounting base;
    a conduction mechanism connecting the tool mounting base to the coil, the conduction mechanism comprising:
        a first flexible hinge;
        a second flexible hinge;
        a first connecting member located between the first flexible hinge and the second flexible hinge; and
        a second connecting member located between the second flexible hinge and the coil of the voice coil motor;
    a displacement measurement mechanism;
    a guide shaft, arranged at a center of the voice coil motor, connecting the displacement measurement mechanism; and to the conduction mechanism;
    a first horizontal screw connecting the tool mounting base, the first flexible hinge, the first connecting member, the second flexible hinge, the second connecting member, and an end of the guide shaft coaxially in series,
    wherein the first flexible hinge and the second flexible hinge have sheet-like cross structures with a same shape, the first flexible hinge and the second flexible hinge each having cross arms with end portions fixedly connected to the base.

2. The electromagnetically driven fast tool servo system according to claim 1, wherein a width of the cross arm of each of the first flexible hinge and the second flexible hinge is greater than ½ of a width of an entirety of the first flexible hinge and the the second flexible hinge.

3. The electromagnetically driven fast tool servo system according to claim 2, further comprising an arc-shaped connecting portion arranged between adjacent cross arms of the first flexible hinge and the second flexible hinge.

4. The electromagnetically driven fast tool servo system according to claim 3, further comprising a second horizontal screw,
    wherein the displacement measurement mechanism comprises:
        a grating ruler;
        a grating ruler reading head arranged at a tail end of the grating ruler;
        a third flexible hinge; and
        a third connecting member,
    wherein the third flexible hinge and the third connecting member connect the grating ruler to an other end of the guide shaft,
    wherein the grating ruler, the third flexible hinge, the third connecting member, and the other end of the guide shaft are connected in series by the second horizontal screw, and
    wherein the third flexible hinge has a sheet-like cross structure, with an end portion of a cross arm fixedly connected to the base.

5. The electromagnetically driven fast tool servo system according to claim 4, wherein a width of the cross arm of the third flexible hinge is less than ⅓ of the width of the entire hinge.

6. The electromagnetically driven fast tool servo system according to claim 4, wherein the base is further provided with a limiting block for axially limiting the third flexible hinge, and the limiting block is located on a side close to the grating ruler.

7. The electromagnetically driven fast tool servo system according to claim 2, further comprising a second horizontal screw,
    wherein the displacement measurement mechanism comprises:
        a grating ruler;
        a grating ruler reading head arranged at a tail end of the grating ruler;
        a third flexible hinge; and
        a third connecting member,
    wherein the third flexible hinge and the third connecting member connect the grating ruler to an other end of the guide shaft, wherein the grating ruler, the third flexible hinge, the third connecting member, and the other end of the guide shaft are connected in series by the second horizontal screw, and wherein the third flexible hinge has a sheet-like cross structure, with an end portion of a cross arm fixedly connected to the base.

8. The electromagnetically driven fast tool servo system according to claim 7, wherein a width of the cross arm of the third flexible hinge is less than ⅓ of the width of the entire hinge.

9. The electromagnetically driven fast tool servo system according to claim 7, wherein the base is further provided with a limiting block for axially limiting the third flexible hinge, and the limiting block is located on a side close to the grating ruler.

10. The electromagnetically driven fast tool servo system according to claim 1, wherein the second connecting member is fixedly connected to the coil of the voice coil motor by a plurality of circumferentially-arranged horizontal screws.

11. The electromagnetically driven fast tool servo system according to claim 1, further comprising a second horizontal screw, wherein the displacement measurement mechanism comprises:
a grating ruler;
a grating ruler reading head arranged at a tail end of the grating ruler;
a third flexible hinge; and
a third connecting member, wherein the third flexible hinge and the third connecting member connect the grating ruler to an other end of the guide shaft, wherein the grating ruler, the third flexible hinge, the third connecting member, and the other end of the guide shaft are connected in series by the second horizontal screw, and wherein the third flexible hinge has a sheet-like cross structure, with an end portion of a cross arm fixedly connected to the base.

12. The electromagnetically driven fast tool servo system according to claim 11, wherein a width of the cross arm of the third flexible hinge is less than ⅓ of the width of the entire hinge.

13. The electromagnetically driven fast tool servo system according to claim 11, wherein a thickness and an axial stiffness of the third flexible hinge are less than those of the first flexible hinge and the second flexible hinge.

14. The electromagnetically driven fast tool servo system according to claim 11, wherein the base is further comprises a limiting block for axially limiting the third flexible hinge, and the limiting block is located on a side adjacent to the grating ruler.

15. The electromagnetically driven fast tool servo system according to claim 1, wherein an end of the guide shaft adjacent to the second connecting member is provided with a step structure.

16. The electromagnetically driven fast tool servo system according to claim 1, wherein the base comprises:
a base plate; and
an enclosure, and wherein the voice coil motor comprises a housing fixedly connected to the enclosure by a plurality of screws.

* * * * *